United States Patent
Hayakawa et al.

(10) Patent No.: US 8,935,168 B2
(45) Date of Patent: Jan. 13, 2015

(54) STATE DETECTING DEVICE AND STORAGE MEDIUM STORING A STATE DETECTING PROGRAM

(75) Inventors: Shoji Hayakawa, Kawasaki (JP); Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 13/355,779

(22) Filed: Jan. 23, 2012

(65) Prior Publication Data
US 2012/0209598 A1     Aug. 16, 2012

(30) Foreign Application Priority Data
Feb. 10, 2011   (JP) .................................. 2011-027917

(51) Int. Cl.
*G10L 17/00*   (2013.01)

(52) U.S. Cl.
USPC ............................ 704/246; 704/257; 704/273

(58) Field of Classification Search
USPC ........................................................ 704/246
See application file for complete search history.

(56) References Cited

U.S. PATENT DOCUMENTS

| | | | | |
|---|---|---|---|---|
| 6,463,415 | B2 * | 10/2002 | St. John ........................ | 704/273 |
| 2001/0056349 | A1 * | 12/2001 | St. John ........................ | 704/270 |
| 2003/0055654 | A1 | 3/2003 | Oudeyer | |
| 2009/0210220 | A1 * | 8/2009 | Mitsuyoshi et al. .......... | 704/207 |
| 2009/0313019 | A1 | 12/2009 | Kato et al. | |
| 2011/0178803 | A1 * | 7/2011 | Petrushin ...................... | 704/270 |
| 2011/0282666 | A1 * | 11/2011 | Washio et al. ................ | 704/246 |

FOREIGN PATENT DOCUMENTS

| | | |
|---|---|---|
| JP | 08-286693 | 11/1996 |
| JP | 11-119791 | 4/1999 |
| JP | 2003-099084 | 4/2003 |
| JP | 2004-317822 | 11/2004 |
| JP | 2005-283647 | 10/2005 |
| JP | 2009-003162 | 1/2009 |
| WO | 2007/148493 | 12/2007 |

OTHER PUBLICATIONS

Japanese Notification of Reasons for Refusal dated Jul. 8, 2014 in Japanese Patent Application No. 2011-027917.

* cited by examiner

*Primary Examiner* — Daniel D Abebe
(74) *Attorney, Agent, or Firm* — Staas & Halsey LLP

(57) ABSTRACT

A state detecting device includes an input unit that receives an input voice sound; an analyzer that calculates a feature parameter of each of plurality of frames extracted from the voice sound; a calculator that calculates the average of the feature parameters of the frames, determines a threshold on the basis of the average and statistical data representing relationships between other averages of other feature parameters obtained from a plurality of speakers and cumulative frequencies of the other feature parameters, and calculates an appearance frequency of a frame that is among the plurality of frames and whose feature parameter is larger than the threshold; a determining unit that determines, on the basis of the appearance frequency, a strained state of a vocal cord that has made the voice sound; and an output unit that outputs a result of the determination.

20 Claims, 16 Drawing Sheets

FIG. 6A
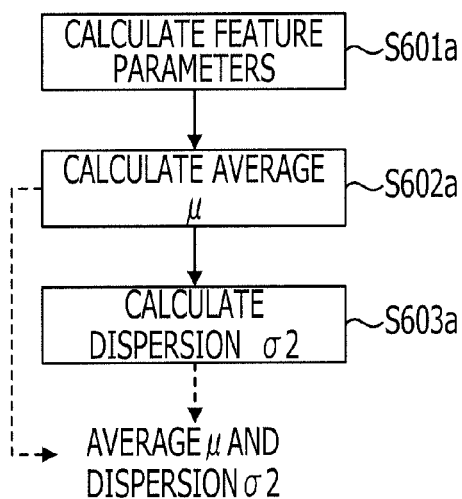
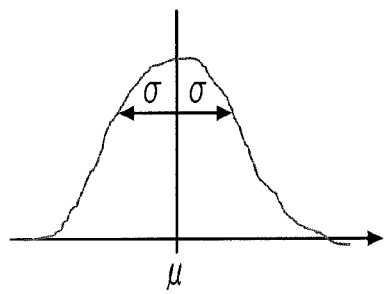
FIG. 6B
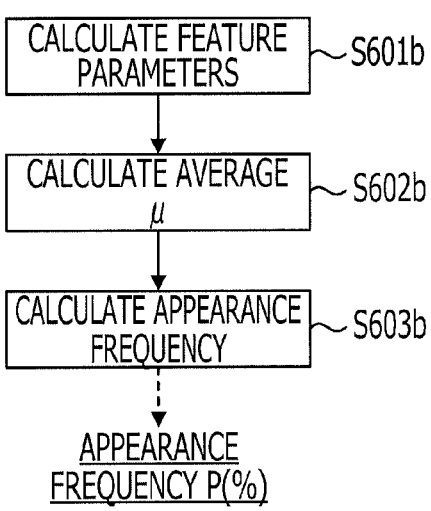
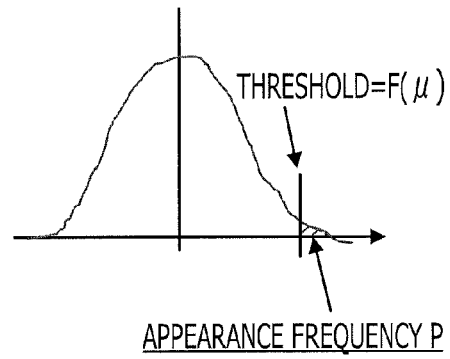

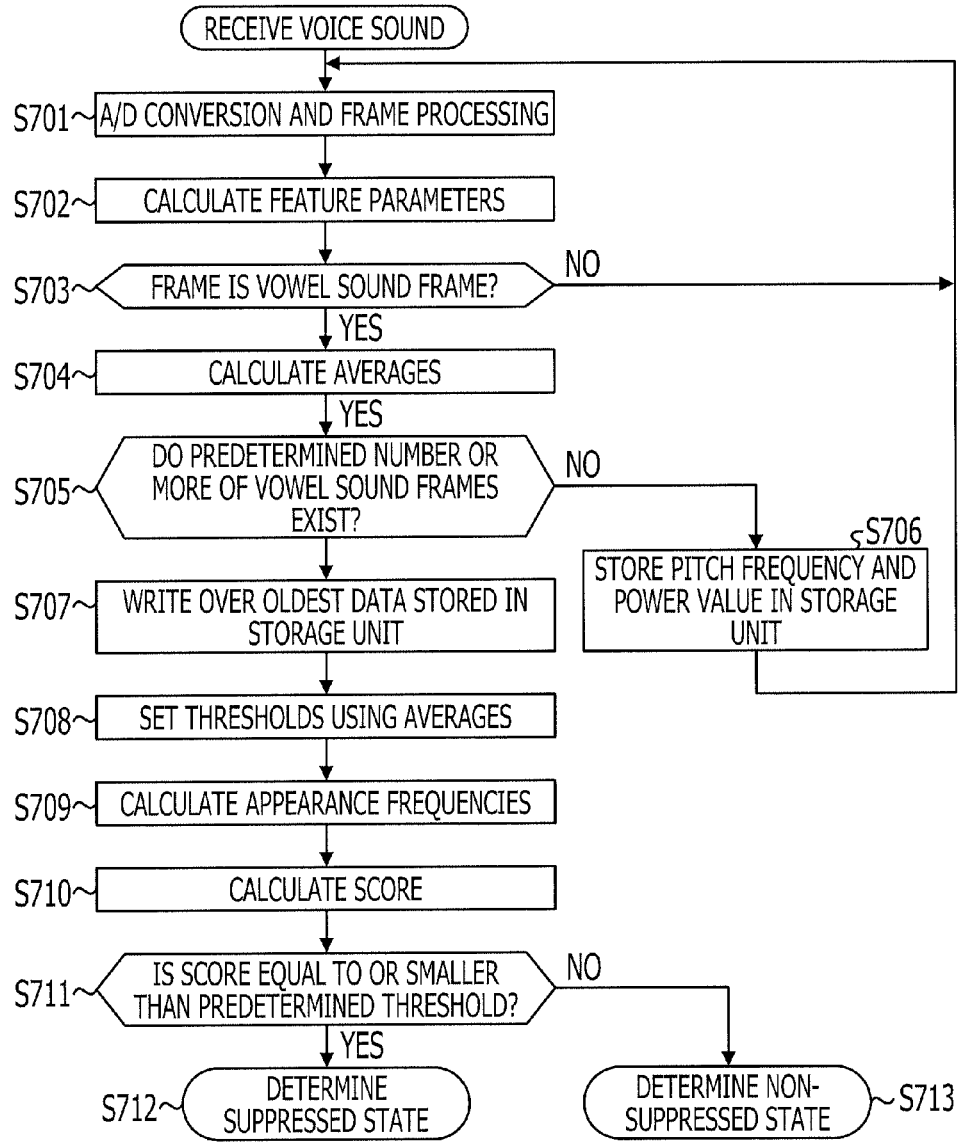

STATE DETECTING DEVICE AND STORAGE MEDIUM STORING A STATE DETECTING PROGRAM

CROSS-REFERENCE TO RELATED APPLICATION

This application is based upon and claims the benefit of priority of the prior Japanese Patent Application No. 2011-27917, filed on Feb. 10, 2011, the entire contents of which are incorporated herein by reference.

FIELD

The present embodiment relates to a device that detects a suppressed state of a speaker and a storage medium storing a state detecting program.

BACKGROUND

With developments of mobile phone technology and car navigation system technology, sound processing technology, including speech recognition, speaker recognition and voice synthesis, has been widely used in many fields. There is a technique for determining a mental state (feeling) of a speaker by analyzing a voice sound uttered by the speaker. This technique is to detect characteristics such as a "strained voice" and a "hoarse voice" in an interval of a frequency signal on the basis of a frequency fluctuation of the waveform of the sound output from a sound source and a fluctuation of a high frequency component of the sound, select an acoustic model suitable for the characteristics and provided for speech recognition, and determine the mental state of the speaker on the basis of the acoustic model and the sound source to which the voice sound is input. In addition, there is a technique for analyzing a mental state of a speaker on the basis of the average of sound volumes in certain frames and a dispersion of the sound volumes. The aforementioned techniques are disclosed in Japanese Patent No. 4085130 and Japanese Laid-open Patent Publication No. 2004-317822, for example.

SUMMARY

According to an aspect of the invention, a state detecting device includes an input unit that receives an input voice sound; an analyzer that calculates a feature parameter of each of plurality of frames extracted from the voice sound; a calculator that calculates the average of the feature parameters of the frames, determines a threshold on the basis of the average and statistical data representing relationships between other averages of other feature parameters obtained from a plurality of speakers and cumulative frequencies of the other feature parameters, and calculates an appearance frequency of a frame that is among the plurality of frames and whose feature parameter is larger than the threshold; a determining unit that determines, on the basis of the appearance frequency, a strained state of a vocal cord that has made the voice sound; and an output unit that outputs a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating differences between a process according to a comparative example and a process according to the embodiment.

FIG. 7 is a flowchart of a control process according to the embodiment.

DESCRIPTION OF EMBODIMENT

It is considered that a suppressed state of a speaker or a strained state of a vocal cord of the speaker is to be detected as a mental state of the speaker. The suppressed state is a state in which the speaker mentally feels pressure from outside. When any of the aforementioned conventional techniques is used, it is necessary to detect a phoneme sequence using speech recognition. Thus, the conventional techniques each have a problem that the accuracy of detecting the phoneme sequence varies depending on the accuracy of the speech recognition. Especially, when a voice uttered under noisy environment or an unknown word is input, a speech recognition error occurs and whereby the accuracy of estimating a feeling is reduced. The phoneme sequence is information of a phrase spoken by the speaker. The unknown word is a word that is not registered in a database to be used for the speech recognition. To avoid the error, the speech recognition needs to be performed using a database that includes a large amount of words. However, it is difficult to implement the speech recognition technique and the database in a mobile phone having a small number of resources.

In the conventional techniques, the state of the speaker may not be detected in consideration of an individuality of the speaker.

An object of the present embodiment is to detect a suppressed state of a speaker in consideration of an individuality of the speaker without performing general speech recognition.

Figure 1:
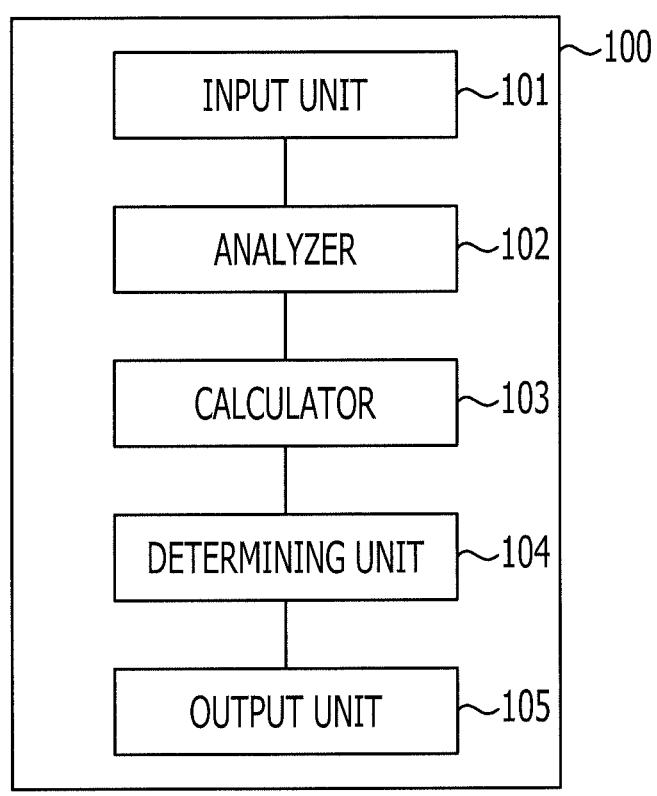
FIG. 1 is a functional block diagram illustrating a suppressed state detecting device according to an embodiment.

FIG. 1 is a functional block diagram illustrating a suppressed state detecting device 100 according to the embodiment. The suppressed state detecting device 100 includes an input unit 101, an analyzer 102, a calculator 103, a determining unit 104 and an output unit 105.

The input unit 101 receives an input voice sound.

The analyzer 102 analyzes each of frames of the input voice sound received by the input unit 101. For example, the analyzer 102 extracts a vowel sound section among the multiple frames, and calculates a fundamental frequency and power of a frame corresponding to the vowel sound section. The frames are information included in regions that are obtained by dividing the input voice sound at certain intervals. After data of the voice sound is converted from an analog signal to a digital signal, the analyzer 102 extracts the frames from the input voice sound at time intervals that may be regarded to be periodically nearly stable. For example, the frames are information that is extracted from the input voice sound at time intervals of approximately 32 milliseconds each.

The calculator 103 uses results of the analysis performed by the analyzer 102 and calculates a frequency distribution of pitch frequencies and a frequency distribution of the power of the input voice sound. The frequency distributions are distributions of the numbers of the frames. Then, the calculator 103 calculates the average of the pitch frequencies, the average of the power, a cumulative frequency distribution of the pitch frequencies and a cumulative frequency distribution of the power. Subsequently, the calculator 103 determines a threshold (to be used for a process described later) for the pitch frequencies on the basis of statistical data stored in advance and the calculated average of the pitch frequencies. The statistical data may be data that provides the frequency distribution of the pitch frequencies. Alternatively, the statistical data may be data to be used to determine a primary approximate straight line that provides a coefficient parameter α (described later) and the like. In addition, the calculator 103 determines a threshold (to be used for a process described later) for the power on the basis of the statistical data stored in advance and the calculated average of the power. The statistical data may be data that provides the frequency distribution of the power. Alternatively, the statistical data may be data to be used to determine a primary approximate straight line that provides a coefficient parameter β (described later) and the like. Data that provides the coefficient parameters to be used to determine the thresholds is not limited to the primary approximately lines. Various types of function data may be used as the data that provides the coefficient parameters to be used to determine the thresholds. The calculator 103 adaptively determines the thresholds on the basis of the calculated averages and the statistical data. The threshold for the pitch frequencies is a threshold for a frequency obtained by dividing the number of frames whose pitch frequencies are larger than a certain value by the number of all the frames, for example. The certain value is a fundamental frequency that is a boundary that indicates that an interested fundamental frequency deviates from the average of the pitch frequencies.

On the other hand, the threshold for the power corresponds to a threshold for a frequency obtained by dividing the number of frames whose power is larger than a certain value by the number of all the frames, for example. The certain value is power that is a boundary that indicates that interested power deviates from the average of the power. Then, the calculator 103 extracts, from the results of the analysis performed on the input voice sound by the analyzer 102, a frame having a fundamental frequency or power, while the fundamental frequency or the power of the extracted frame is a characteristic value on the basis of the comparison of the pitch frequencies or the power with the interested threshold. For example, the characteristic value is a fundamental frequency that is different by the threshold (for the pitch frequencies) or more from the average of the analyzed pitch frequencies. For example, the characteristic value is power that is different by the threshold (for the power) or more from the average of the analyzed power. The characteristic value is also called an outlier.

Figure 2A:
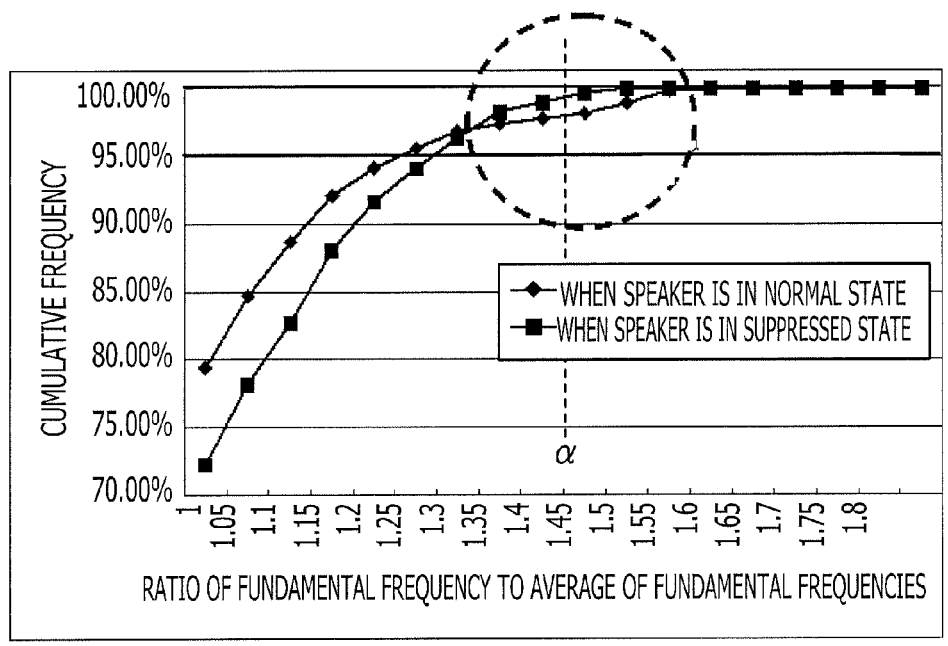
FIGS. 2A and 2B are diagrams illustrating a principle of a state detection method according to the embodiment.
Figure 2B:
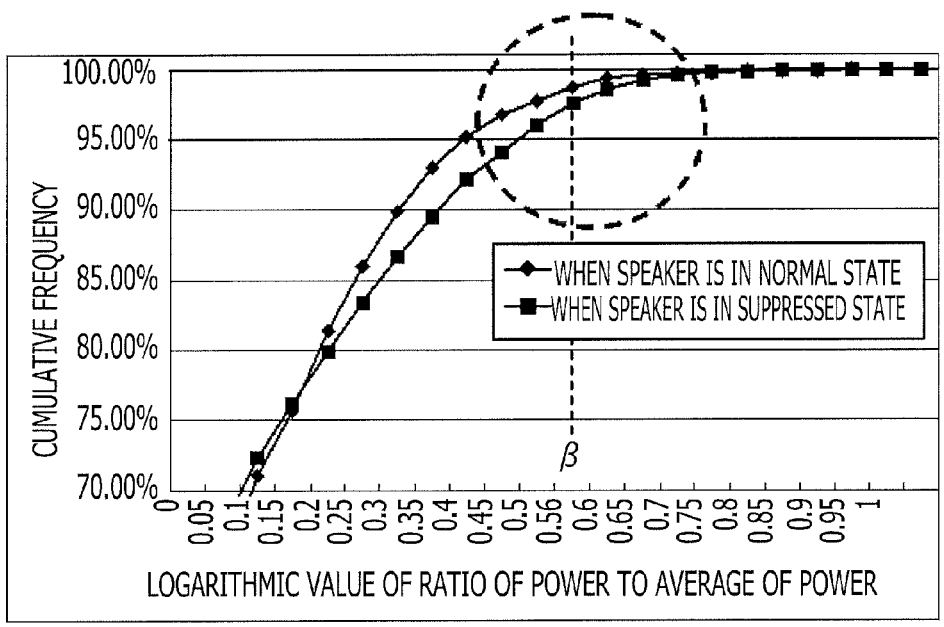

FIGS. 2A and 2B are diagrams each illustrating a principle of a method for detecting a state of a speaker on the basis of an outlier (characteristic value) that is a fundamental frequency and an outlier (characteristic value) that is a logarithmic value of power according to the embodiment. FIG. 2A is a diagram illustrating a cumulative frequency distribution in which a cumulative frequency of frames having a fundamental frequency for the ratio of the fundamental frequency to the average of all the pitch frequencies is plotted. FIG. 2A illustrates data obtained from the speaker who is in the suppressed state and data obtained from the speaker who is in a non-suppressed state. In a range surrounded by a broken-line circle illustrated in FIG. 2A, the number of frames that are extracted from a voice sound made by the speaker in the suppressed state and have pitch frequencies that are outliers is small, and cumulative frequencies of frames extracted from the voice sound made by the speaker in the suppressed state tend to be higher than cumulative frequencies of frames extracted from a voice sound made by the speaker in the non-suppressed state. Thus, the suppressed state and the non-suppressed state may be distinguished on the basis of a distribution part around which a cumulative frequency of frames becomes equal to 100% on the basis of the threshold that determines an outlier that is a fundamental frequency.

In addition, FIG. 2B is a diagram illustrating a cumulative frequency distribution in which a cumulative frequency of frames having power for a logarithmic value of the ratio of the power to the average of all power is plotted. In a range surrounded by a broken-line circle illustrated in FIG. 2B, cumulative frequencies of frames extracted from the voice sound made by the speaker in the suppressed state tend to be lower than cumulative frequencies of frames extracted from the voice sound made by the speaker in the non-suppressed state. Thus, the suppressed state and the non-suppressed state may be distinguished on the basis of a distribution part around which a cumulative frequency of frames becomes equal to 100% on the basis of the threshold that determines an outlier that is power.

Based on the aforementioned principle, the calculator 103 calculates a frequency of frames having pitch frequencies that are outliers or a frequency of frames having power that is outliers.

Then, the determining unit 104 determines the suppressed state of the speaker on the basis of the frequency of the frames having the pitch frequencies that are the outliers or the frequency of the frames having the power that is the outliers. For example, the determining unit 104 calculates a score that is provided for the pitch frequencies and indicates a high or low level of the suppressed state. The determining unit 104 calculates a score that is provided for the power and indicates a high or low level of the suppressed state. The lower an appearance frequency of frames having pitch frequencies that are outliers, the lower the score. In addition, the higher an appearance frequency of frames having power whose logarithmic values are outliers, the lower the score. Then, when the sore is equal to or lower than a certain value, the determining unit 104 determines that the suppressed state is a strongly suppressed state. In the present embodiment, the determining unit 104 determines a highly strained state of a vocal cord of the speaker as the suppressed state.

The output unit 105 outputs a result of the determination made by the determining unit 104.

Figure 3:
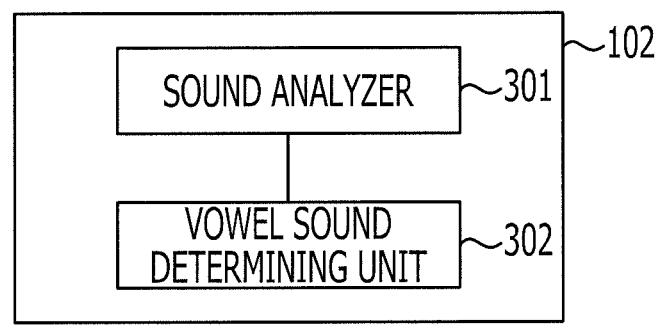
FIG. 3 is a functional block diagram illustrating an analyzer.

FIG. 3 is a block diagram illustrating the analyzer 102 illustrated in FIG. 1. The analyzer 102 includes a sound analyzer 301 that analyzes the voice sound and extracts pitch frequencies and power from the voice sound. In addition, the analyzer 102 includes a vowel sound determining unit 302 that determines a vowel sound section and outputs a fundamental frequency of the vowel sound section and power of the vowel sound section to the calculator 103.

Figure 4:
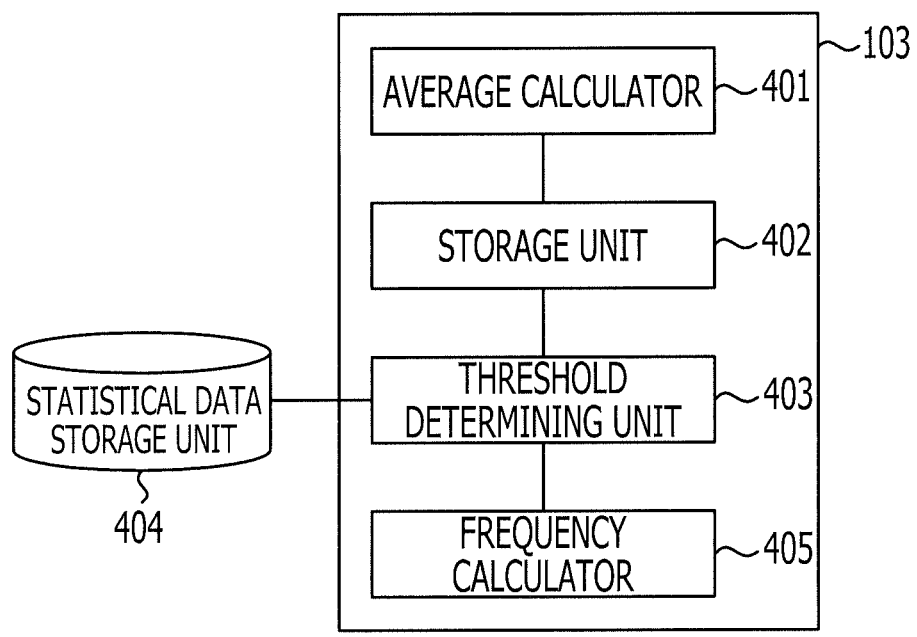
FIG. 4 is a functional block diagram illustrating a calculator.

FIG. 4 is a block diagram illustrating the calculator 103 illustrated in FIG. 1. The calculator 103 includes an average calculator 401 that calculates the average of the pitch frequencies and the average of the power.

The calculator 103 calculates, in accordance with Equation (1), the appearance frequency of the frames having the pitch frequencies that are the outliers. In addition, the calculator 103 calculates, in accordance with Equation (2), the appearance frequency of the frames having the logarithmic power values that are the outliers. Specifically, the calculator 103 divides the number $N_{pitch}$ of outliers that are pitch frequencies of frames among the current frame and frames preceding the current frame by the number N of all vowel sound frames. In addition, the calculator 103 divides the number $N_{power}$ of outliers that are power of frames among the current frame and frames preceding the current frame by the number N of all vowel sound frames. The appearance frequencies are indicated by $P_{pitch}$ and $P_{power}$.

$$P_{pitch} = N_{pitch}/N \quad (1)$$

$$P_{power} = N_{power}/N \quad (2)$$

Pitch frequencies that are output from the vowel sound determining section 302 are stored for a certain number of the latest vowel sound frames. Power values that are output from the vowel sound determining section 302 are stored for the certain number of the latest vowel sound frames. The calculator 103 includes a storage unit 402 that has a ring buffer, for example. In addition, the calculator 103 includes a threshold determining unit 403. The threshold determining unit 403 determines a threshold on the basis of the average (of the pitch frequencies) calculated by the average calculator 401 and the statistical data stored in a statistical data storage unit 404. In addition, the threshold determining unit 403 determines a threshold on the basis of the average of the power and the statistical data. The calculator 103 includes a frequency calculator 405. The frequency calculator 405 extracts, on the basis of the thresholds, outliers that are power and pitch frequencies. The frequency calculator 405 calculates an appearance frequency of frames having the pitch frequencies that are equal to or larger than the threshold for the pitch frequencies. In addition, the frequency calculator 405 calculates an appearance frequency of frames having the power that is equal to or larger than the threshold for the power.

Figure 5:
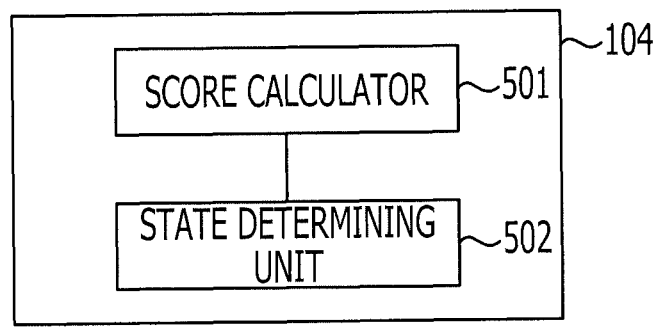
FIG. 5 is a functional block diagram illustrating a determining unit.

FIG. 5 is a block diagram illustrating the determining unit 104 illustrated in FIG. 1. The determining unit 104 includes a score calculator 501 that calculates distributions of modified cumulative frequencies of the pitch frequencies and the power and calculates a score on the basis of the distributions of the modified cumulative frequencies. The lower the appearance frequency of frames having a fundamental frequency that is an outlier, the lower the modified cumulative frequency of the frames having the fundamental frequency. The higher the appearance frequency of frames having power that is an outlier, the lower the modified cumulative frequency of frames having the power. The determining unit 104 further includes a state determining unit 502. The state determining unit 502 determines, on the basis of the score calculated by the score calculator 502, whether or not "the speaker is in the suppressed state". The state determining unit 502 outputs the result of the determination.

Basic operations of the device that has the configurations described with reference to FIGS. 1 to 5 in the embodiment are described below in comparison with a comparative example.

FIGS. 6A and 6B are diagrams illustrating differences between a process according to the comparative example (illustrated in FIG. 6A) and a process according to the present embodiment (illustrated in FIG. 6B).

In the comparative example, feature parameters that are pitch frequencies or power are calculated from an input voice sound (in operation S601a). In the present embodiment, feature parameters that are pitch frequencies or power are calculated from an input voice sound (in operation S601b). In the comparative example, the average $\mu$ of the feature parameters is calculated (in operation S602a). In the present embodiment, the average $\mu$ of the feature parameters is calculated (in operation S602b).

In the process according to the comparative example, a dispersion $\sigma^2$ that is determined using the average $\mu$ as a reference is calculated as a statistical amount in many cases as illustrated in a graph of FIG. 6A (in operation S603a). The pitch frequencies and the power are easily affected by differences among tones of voice sounds of users and differences among voice volumes of the users. Thus, in the conventional technique for determining a feeling of a user (making the voice sound) using power of the target input voice sound, the voice sound of the user may not be distinguished between "a voice sound that is originally loud" and "a voice sound that is loud owing to the suppressed state". As illustrated in FIG. 6A, in the conventional technique, even when the feeling of the user is to be determined using the pitch frequencies of the input voice sound, the voice sound may not be distinguished between "the voice sound that is originally loud" and "the voice sound that is loud owing to the suppressed state".

As described above, in the process according to the comparative example, the suppressed state of the user may not be detected even when a certain threshold is used. This is due to the fact that the volumes (power) of voice sounds of users and the tones (pitch frequencies) of the voice sounds of the users vary depending on the users.

In the process according to the comparative example, in order to support the differences among the users, it is necessary to register voice sounds of the users and restrict the contents of the voice sounds. Thus, it is difficult to detect a suppressed state of each of the users in consideration of the differences among the users in the process of detecting a suppressed state according to the comparative example and in the process of detecting a suppressed state using a certain set threshold.

In the present embodiment, a statistical value that is used to detect a suppressed state from a voice sound is an appearance frequency P of frames having outliers that are equal to or larger than an interested threshold as illustrated in FIG. 6B and the appearance frequency P is calculated (in operation S603b). In the process according to the present embodiment, a section that is regarded as an outlier and used to calculate the statistical value is variable depending on the interested threshold that is adaptively determined. The threshold for the pitch frequencies is calculated as a function $F(\mu)$ that is related to a coefficient parameter $\alpha$ and the average $\mu$ of the pitch frequencies, for example. For example, the threshold F is expressed by the following equation.

$$F(\mu)=\mu\times\alpha$$

The threshold F is α times larger than the average μ of the pitch frequencies and causes the coefficient parameter α to adaptively change depending on the average of the pitch frequencies.

For example, the average of the pitch frequencies, and the coefficient parameter a that causes a cumulative frequency to be 99%, are calculated for each of many speakers. A linear function that represents the coefficient parameter α and the average μ of the pitch frequencies is approximately calculated. The coefficient parameter α is adaptively determined using the linear function on the basis of the average μ of the pitch frequencies of the input signal. Specifically, the coefficient parameter α adaptively varies depending on the average of the pitch frequencies on the basis of a linear approximate equation, while the average of the pitch frequencies varies depending on the person. When the coefficient parameter α changes, the threshold F adaptively changes.

The non-suppressed state and the suppressed state may be distinguished on the basis of the range surrounded by the broken-line circle illustrated in FIG. 2A by using the threshold F that corresponds to the coefficient parameter α that is adaptively determined on the basis of the average of the pitch frequencies. In addition, the non-suppressed state and the suppressed state may be distinguished on the basis of the range surrounded by the broken-line circle illustrated in FIG. 2B by using a threshold F that corresponds to the coefficient parameter β that is adaptively determined on the basis of a logarithmic value of the average of power.

In the process according to the present embodiment, a voice sound of a user who is in the suppressed state may be accurately detected. In addition, voice sounds of users may be detected in consideration of differences among the users by setting the thresholds using the average of pitch frequencies of each of the input voice sounds and the average of power of each of the input voice sounds. Frames that have power that is outliers are frames that have large power. Thus, signal-to-noise ratios are high, and whereby a voice sound of a user who is in the suppressed state may be stably detected even under a noisy environment.

Next, operations of the device that has the configurations described with reference to FIGS. 1 to 5 in the embodiment are described below. FIG. 7 is a flowchart of a control process according to the embodiment, while the control process is performed by a computer that has the aforementioned configurations. The control process is described with reference to the flowchart of FIG. 7.

In the present embodiment, the control process may be performed in a mobile phone. When a voice sound signal is input to the mobile phone from a user through a microphone that is provided for communication and included in the mobile phone, the input unit 101 (illustrated in FIG. 1) that serves as a voice sound receiver performs operation S701 illustrated in FIG. 7. In operation S701, the input unit 101 performs a low-pass filtering process on the analog voice sound signal and then converts the analog voice sound signal into a digital signal. The low-pass filtering process and the analog-to-digital conversion may be performed by dedicated hardware. In addition, the low-pass filtering process and the analog-to-digital conversion may be performed by software executed by a digital signal processor (DSP) or the like. Next, the input unit 101 performs frame processing in order to analyze the voice sound signal. In the frame processing, the input unit 101 extracts, from sampled values of the digitalized input voice sound, sampled values (of the digitalized input voice sound) for a certain time period that is regarded to be periodically nearly stable. Then, the input unit 101 multiplies each of the sampled values by window data that is called an analysis window. In this case, window data whose maximum value is 1 and whose value is closer to 0 as the value of the data is closer to both ends of a frame is used as the analysis window and called a hamming window or a hanning window, for example. The window data is multiplied by the sampled values in order to inhibit sampled values (of the input voice sound) causing large amplitude changes at both ends of the frame (to be analyzed) from adversely affecting the process of analyzing the voice sound.

Next, the sound analyzer 301 illustrated in FIG. 3 performs operation S702 illustrated in FIG. 7. In operation S702, the sound analyzer 301 calculates power and pitch frequencies as feature parameters that are used to detect the suppressed state. In order to extract the pitch frequencies, the sound analyzer 301 performs a known voice sound analysis process (such as an autocorrelation technique, a cepstrum technique, or a partial autocorrelation technique) on the voice sound data subjected to the frame processing by the input unit 101. The sound analyzer 301 calculates, as the power, the sum of squares of the sampled values of the voice sound data subjected to the frame processing by the input unit 101 or a logarithmic value of the sum of the squares of the sampled values of the voice sound data subjected to the frame processing by the input unit 101.

Next, the vowel sound determining unit 302 illustrated in FIG. 3 performs operation S703 illustrated in FIG. 7. In operation S703, the vowel sound determining unit 302 determines whether or not a frame that is currently processed is a vowel sound frame. The operation S703 is performed in order to calculate distributions of pitch frequencies and power of frames determined to be vowel sound frames and thereby obtain stable results.

Specifically, the vowel sound determining unit 302 determines whether or not the power of the voice sound data subjected to the frame processing by the input unit 101 or a peak value of an autocorrelation function is larger than a certain threshold. The vowel sound determining unit 302 determines that a frame that has a larger peak value of power than the threshold or a larger peak value of an autocorrelation function than the threshold is a vowel sound frame.

When the vowel sound determining unit 302 determines that the frame that is currently processed is not a vowel sound frame or when the result of the determination made in operation S703 indicates "NO", the process returns to operation S701 so that the input unit 101 processes the next frame to be analyzed.

When the vowel sound determining unit 302 determines that the frame that is currently processed is a vowel sound frame or when the result of the determination made in operation S703 indicates "YES", the average calculator 401 illustrated in FIG. 4 performs operation S704 illustrated in FIG. 7.

In operation S704, the average calculator 401 calculates the average of the pitch frequencies calculated in operation S702 and the average of the power calculated in operation S702. As the averages, the average of pitch frequencies of vowel sound frames stored in the storage unit 402 and the average of power of the vowel sound frames stored in the storage unit 402 are calculated. The vowel sound frames that are used to calculate the averages may be full vowel sound frames. In addition, as the averages, the following averages may be calculated: the averages of pitch frequencies and power of vowel sound frames (stored in the storage unit 402 illustrated in FIG. 4) for a fixed time period (of, for example, 100 seconds) up to a time corresponding to the current frame.

Next, it is determined whether or not a certain number or more of vowel sound frames exist in operation S705 illustrated in FIG. 7. The number of the frames to be analyzed is the number of the frames for the time period of 100 seconds, for example.

When the certain number or more of vowel sound frames do not exist in the storage unit 402 (NO in operation S705), a fundamental frequency and a power value that are calculated from the current frame to be analyzed are stored in the storage unit 402 in operation S706 illustrated in FIG. 7. After that, the process returns to operation S701 so that the input unit 101 processes the next frame to be analyzed. When the certain number or more of vowel sound frames exist in the storage unit 402 (YES in operation S705), the pitch frequencies calculated in operation S702 and the power calculated in operation S702 are written over pitch frequencies relating to the oldest data and power relating to the oldest data in the storage unit 402. In this manner, the pitch frequencies and power of the vowel sound frames for the time period (of 100 seconds) up to the time corresponding to the current frame are stored in the storage unit 402. Then, in operation S704, the average calculator 401 calculates the average of the pitch frequencies and the average of the power.

Next, the threshold determining unit 403 illustrated in FIG. 4 performs operation S708 illustrated in FIG. 7. In operation S708, the threshold determining unit 403 determines the thresholds that are used to determine whether or not the pitch frequencies and the power are outliers. Specifically, the threshold determining unit 403 determines the thresholds on the basis of the averages calculated in operation S704 and the statistical data stored in the statistical data storage unit 404 illustrated in FIG. 4.

The coefficient parameter that is related to the threshold for the pitch frequencies is indicated by $\alpha$. The average (of the pitch frequencies) calculated in operation S704 is indicated by pitch_mean. The fundamental frequency of the current frame is indicated by pitch. In the present embodiment, when the following Formula (3) is established, the threshold determining unit 403 determines that the fundamental frequency (of the current frame) indicated by pitch is an outlier. In this case, the outlier is a fundamental frequency that is larger than a value that is $\alpha$ times larger than the average of the pitch frequencies. The outlier may be a fundamental frequency that is equal to or larger than the value that is $\alpha$ times larger than the average of the pitch frequencies. Thus, the threshold is a value obtained by multiplying the coefficient parameter $\alpha$ by the average of the pitch frequencies as expressed by the following Formula (3).

$$\alpha \cdot \text{pitch\_mean} < \text{pitch} \quad (3)$$

In addition, the coefficient parameter that is related to the threshold for the power is indicated by $\beta$; the average (of the power) calculated in operation S704 is indicated by power_mean; and the power of the current frame is indicated by power. In the present embodiment, when the following Formula (4) is established, the threshold determining unit 403 determines that the power (of the current frame) indicated by power is an outlier. The outlier that is power is a value that is larger than the sum of the normalized average of the power and the coefficient parameter $\beta$. The normalized average of the power is a logarithmic value of the average of the power. Thus, the threshold that determines the outlier that is a logarithmic value of the power is equal to the sum of the coefficient parameter $\beta$ and the logarithmic value of the average of the power.

$$\beta + \log_{10}(\text{power\_mean}) < \log_{10}(\text{power}) \quad (4)$$

Next, examples of a cumulative frequency distribution of pitch frequencies are illustrated in FIGS. 8A, 8B, 9A and 9B.

Figure 8A:
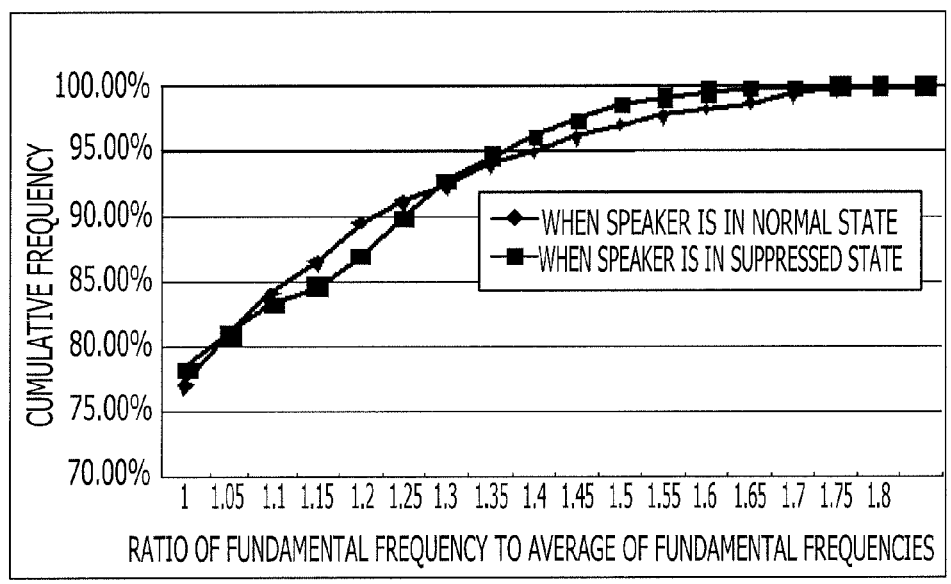
FIGS. 8A and 8B are diagrams each illustrating a first example of a cumulative frequency distribution of pitch frequencies.
Figure 8B:
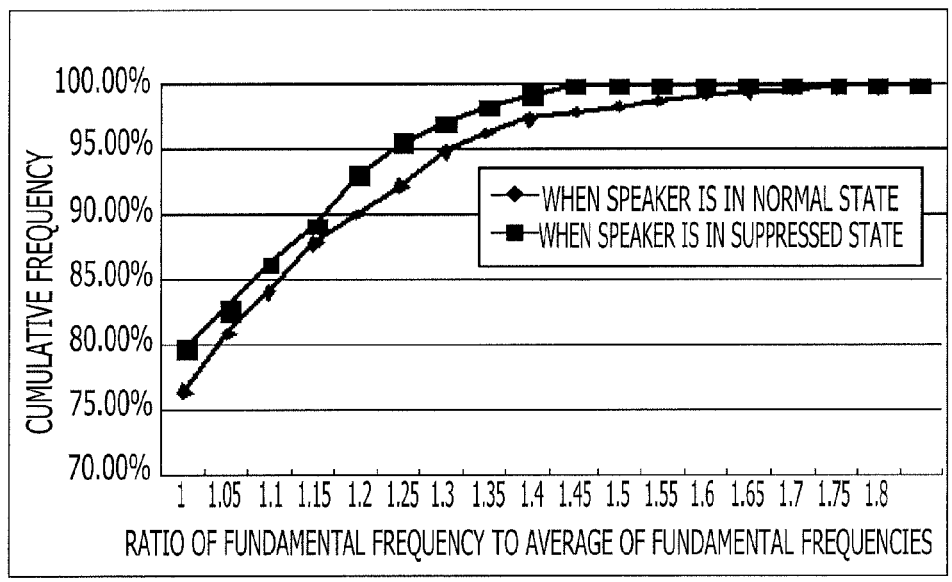
Figure 9A:
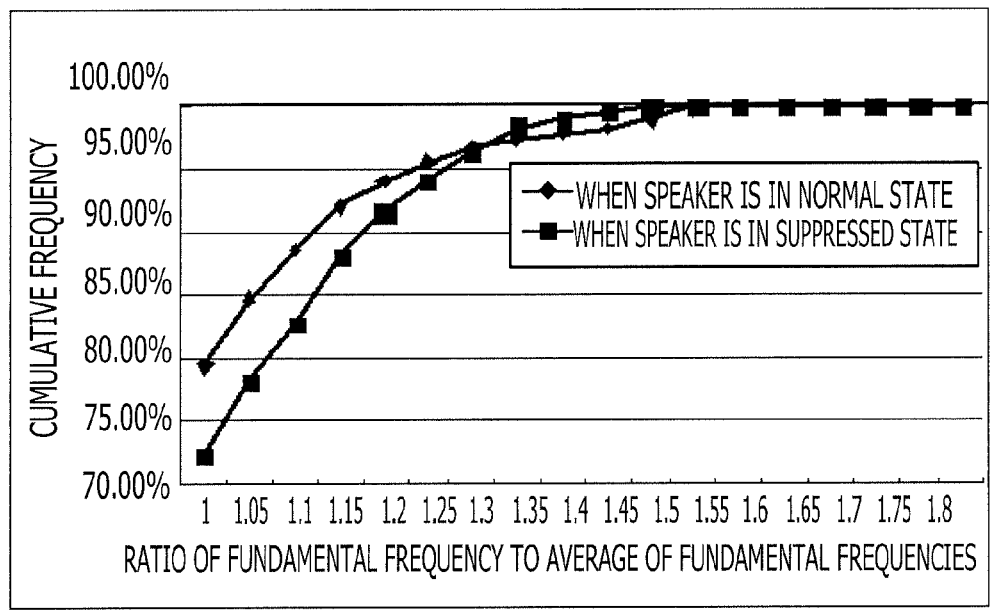
FIGS. 9A and 9B are diagrams each illustrating a second example of a cumulative frequency distribution of pitch frequencies.
Figure 9B:
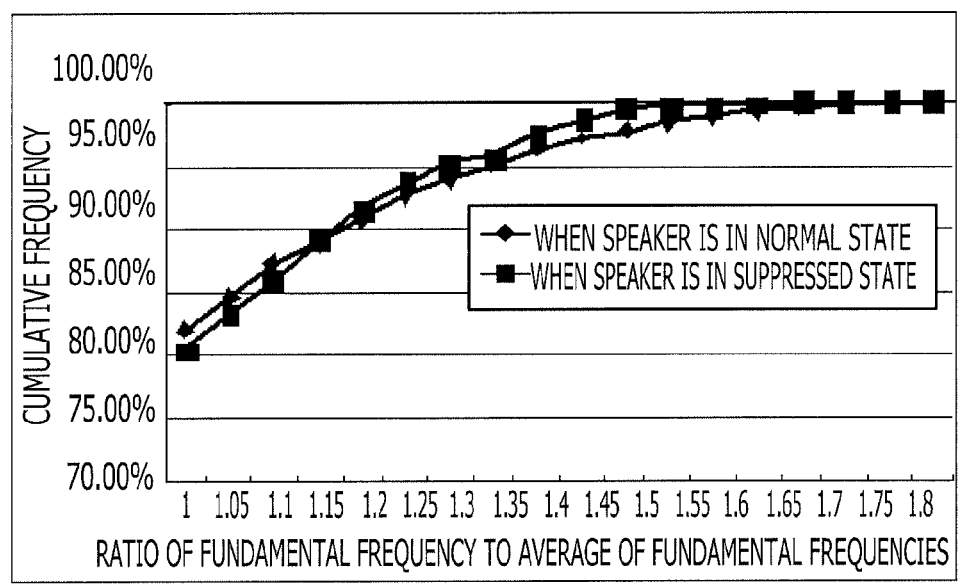
Figure 10A:
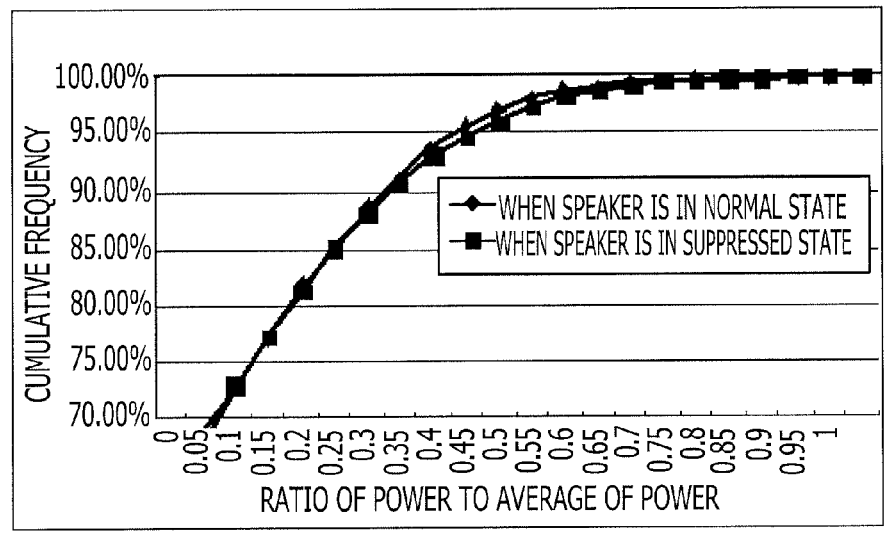
FIGS. 10A and 10B are diagrams each illustrating a first example of a cumulative frequency distribution of logarithmic values of power.
Figure 10B:
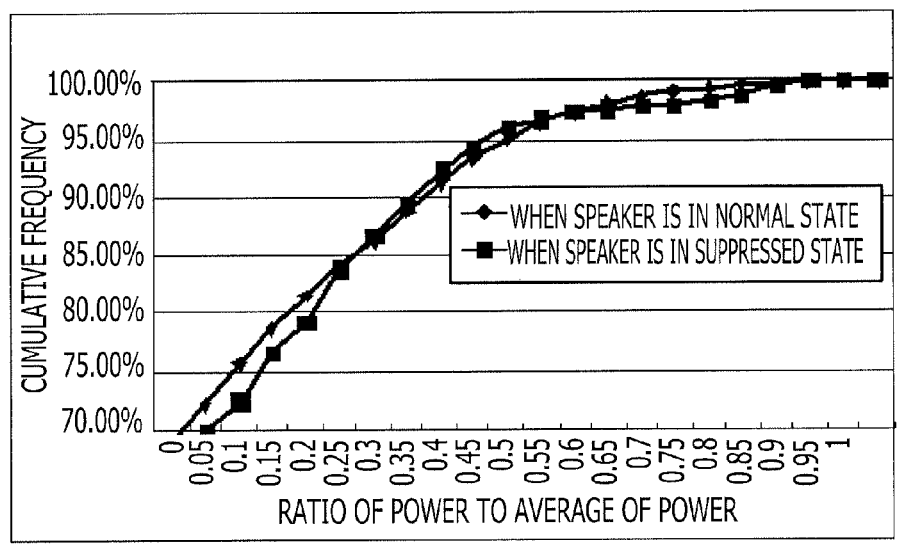
Figure 11A:
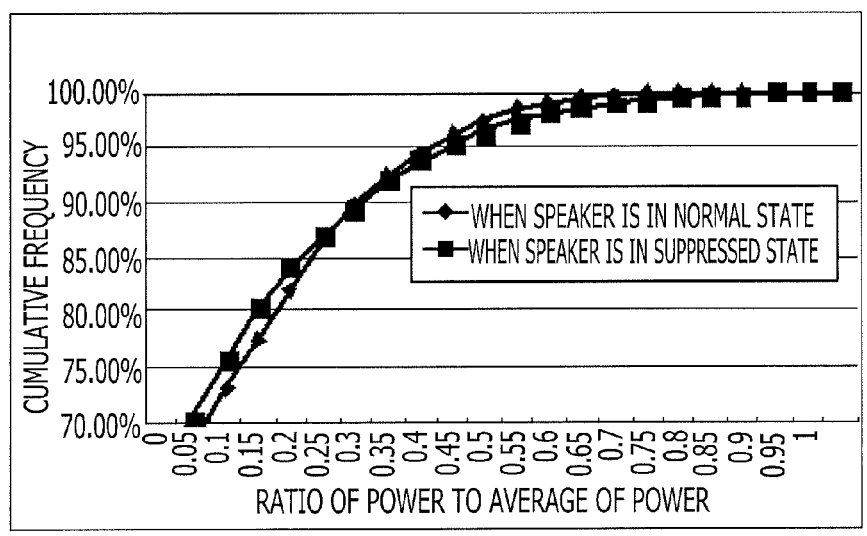
FIGS. 11A and 11B are diagrams each illustrating a second example of a cumulative frequency distribution of logarithmic values of power.
Figure 11B:
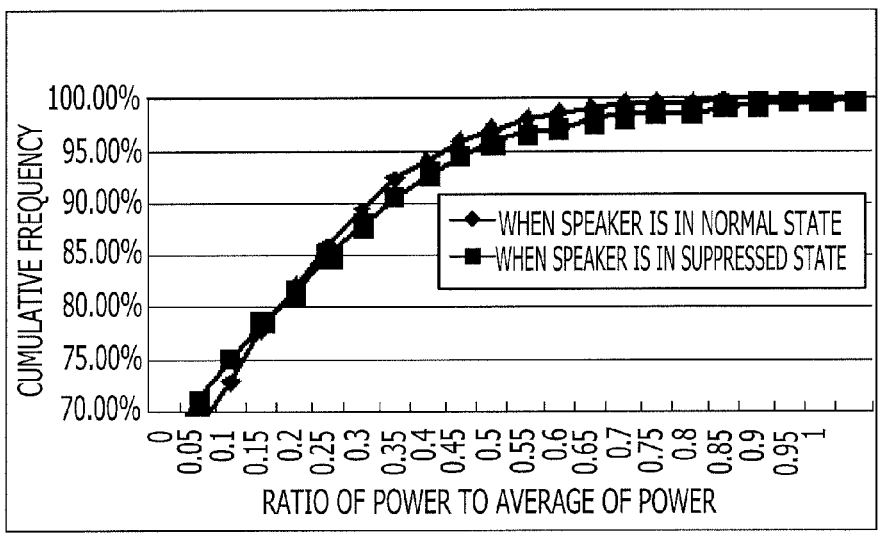

In each of FIGS. 8A, 8B, 9A and 9B, a value that is plotted along the abscissa corresponds to the coefficient parameter a expressed by Formula (3). In other words, the abscissa indicates a value obtained by dividing a fundamental frequency of each of vowel sound frames by the average of pitch frequencies of the vowel sound frames. When the value that is plotted along the abscissa is 1.0, the value indicates the average of the pitch frequencies. When the value that is plotted along the abscissa is 1.5, the value indicates a fundamental frequency that is 1.5 times larger than the average of the pitch frequencies. FIG. 8A illustrates results of a male speaker 1. FIG. 8B illustrates results of a male speaker 2. FIG. 9A illustrates results of a female speaker 1. FIG. 9B illustrates results of a female speaker 2. In each of FIGS. 8A, 8B, 9A and 9B, the value that is plotted along the abscissa is normalized using the average of the pitch frequencies. Thus, in each of FIGS. 8A, 8B, 9A and 9B, a cumulative frequency of frames having a fundamental frequency that causes the value plotted along the abscissa to be in a range of 1.4 to 1.5 and is obtained from the speaker who is in the suppressed state is higher than a cumulative frequency of frames having a fundamental frequency that causes the value plotted along the abscissa to be in the range of 1.4 to 1.5 and is obtained from the speaker who is in the non-suppressed state (normal state). This is due to the fact that the number of outliers that are equal to or larger than the threshold and obtained from the speaker who is in the non-suppressed state is large.

In other words, the examples illustrated in FIGS. 8A, 8B, 9A and 9B each indicate that the lower an appearance frequency of frames having pitch frequencies that are outliers, the more accurately the speaker may be determined to be in the suppressed state. The computer according to the present embodiment determines, on the basis of the threshold F, whether or not a fundamental frequency of each of frames is an outlier. The computer according to the present embodiment calculates an appearance frequency of frames having pitch frequencies that are outliers and thereby determines whether or not the speaker is in the suppressed state.

Next, examples of a cumulative frequency distribution of power are illustrated in FIGS. 10A, 10B, 11A and 11B. In each of FIGS. 10A, 10B, 11A and 11B, a value that is plotted along the abscissa corresponds to the coefficient parameter $\beta$ expressed by Formula (4). In each of FIGS. 10A, 10B, 11A and 11B, the abscissa indicates a logarithmic value of the ratio of the power of each of the vowel sound frames to the average of the power of the vowel sound frames. The value that is plotted along the abscissa is the logarithmic value of the ratio of power of a vowel sound frame to the average of the power of the vowel sound frames. In this manner, the value that is plotted along the abscissa is normalized using the average of the power. Thus, in each of FIGS. 10A, 10B, 11A and 11B, a cumulative frequency of frames having power that causes the value plotted along the abscissa to be approximately 0.6 and is obtained from the speaker who is in the suppressed state is lower than a cumulative frequency of frames having power that causes the value plotted along the abscissa to be approximately 0.6 and is obtained from the speaker who is in the non-suppressed state (normal state). This is due to the fact that the number of outliers obtained from the speaker who is in the suppressed state is large. In other words, the examples illustrated in FIGS. 10A, 10B, 11A and 11B each indicate that the higher an appearance frequency of frames having power that is outliers, the more accurately the speaker may be determined to be in the suppressed state. The computer according to the present embodiment determines, on the basis of the threshold F, whether or not power of each of frames is an outlier. The computer according to the present embodiment calculates an appearance frequency of frames having power (that is outliers) and thereby determines whether or not the speaker is in the suppressed state.

Figure 12:
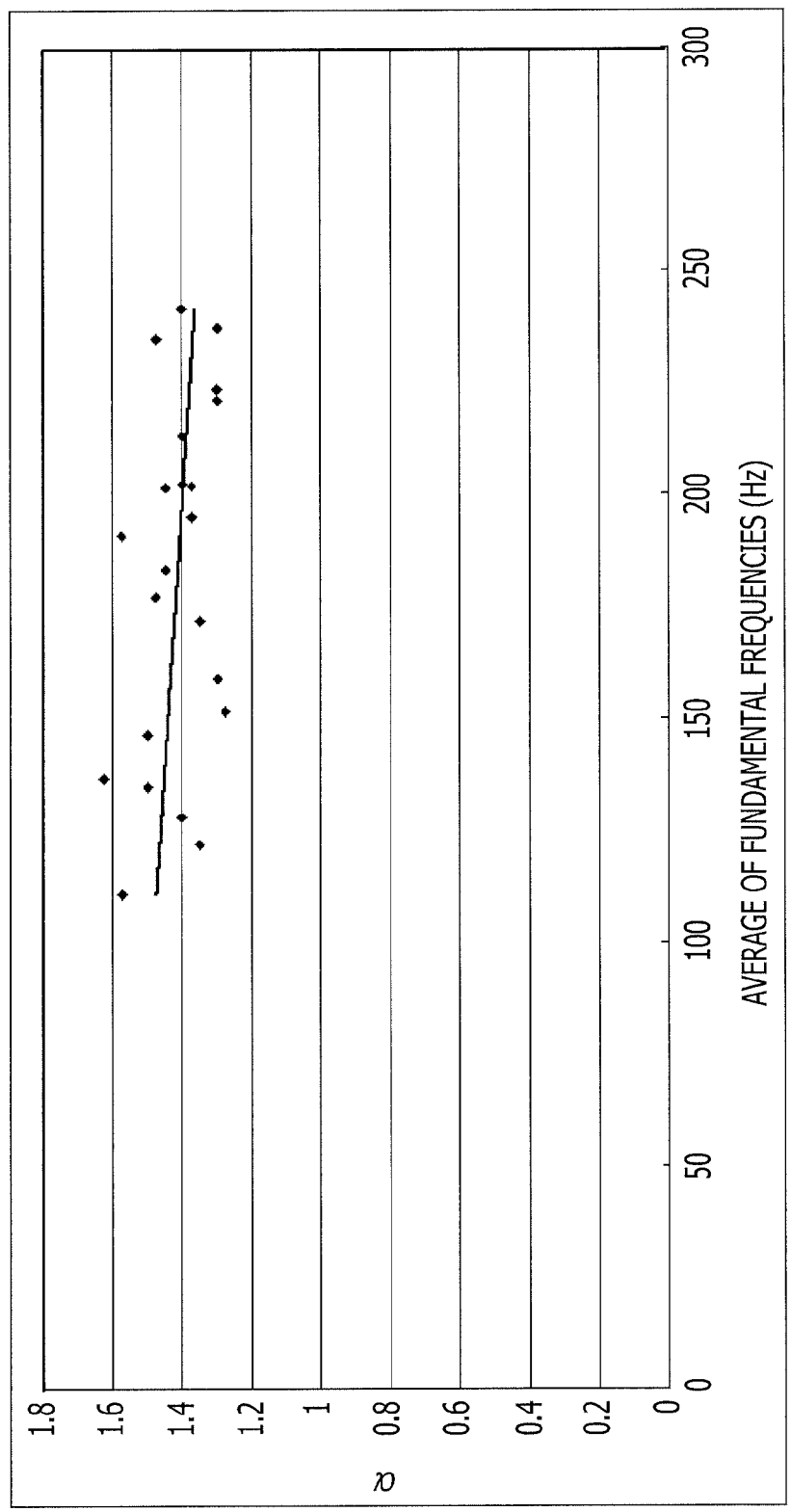
FIG. 12 is a diagram illustrating relationships between the averages of pitch frequencies and a coefficient parameter $\alpha$.
Figure 13:
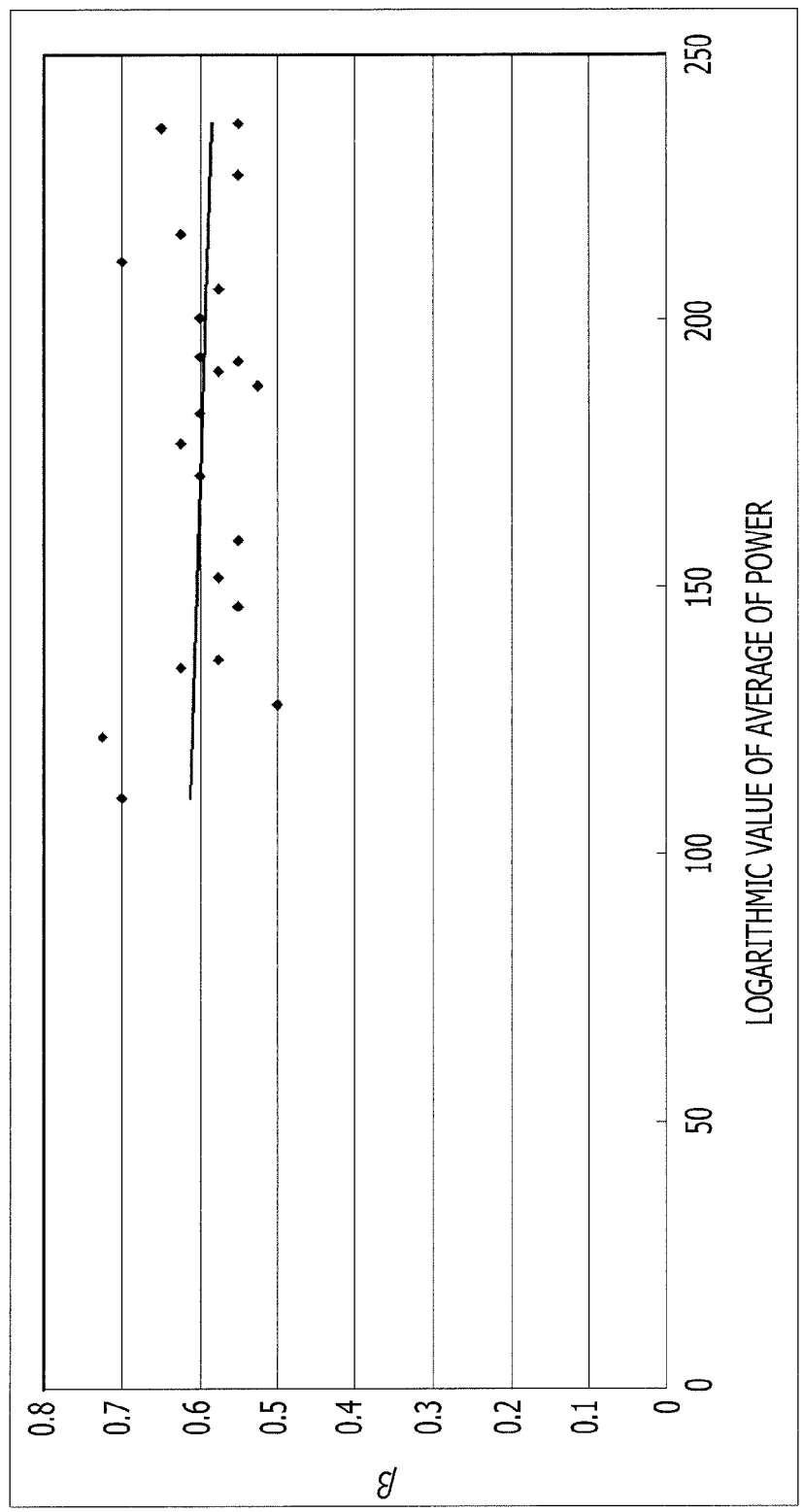
FIG. 13 is a diagram illustrating relationships between the averages of pitch frequencies and a coefficient parameter $\beta$.

In operation S708, the threshold determining unit 403 determines the thresholds as follows in order to eliminate dependencies on speakers. The computer according to the present embodiment analyzes data of voice sounds of a plurality of speakers and calculates, for each of the plurality of speakers, values that cause cumulative frequencies to be, for example, 99%. As a result, as indicated in examples illustrated in FIGS. 12 and 13, the computer according to the present embodiment obtains relationships between the averages of pitch frequencies and the coefficient parameter α and relationships between logarithmic values of the averages of power and the coefficient parameter β. The computer calculates primary approximate straight lines from the obtained results. When the plurality of speakers are in the non-suppressed state, it is preferable that the computer receive the data of the voice sounds of the speakers. The computer creates statistical data from the data of the voice sounds of the plurality of speakers in the non-suppressed state and may thereby determine the thresholds on the basis of the values that cause the cumulative frequencies of frames obtained from the speakers in the non-suppressed state to be 99%. Then, data of the primary approximate straight lines is stored in the statistical data storage unit 404 illustrated in FIG. 4, for example. In operation S708, the threshold determining unit 403 receives the averages (of the pitch frequencies and the power) calculated in operation S704, and references the data that indicates the primary approximate straight lines and is stored in the statistical data storage unit 404 illustrated in FIG. 4. Then, the threshold determining unit 403 determines the thresholds. In this manner, the threshold determining unit 403 may determine the thresholds that do not depend on the speakers. The aforementioned values that are used to determine the thresholds are not limited to the values that cause the cumulative frequencies to be 99%. The values that are used to determine the thresholds are determined by comprehensively checking values of cumulative frequency distributions in which differences between cumulative frequencies of frames having outliers are the maximum values. Then, the coefficient parameters α and β may be values of the cumulative frequency distributions and used to set the thresholds.

Subsequently, the frequency calculator 405 illustrated in FIG. 4 performs operation S709 illustrated in FIG. 7. The frequency calculator 405 compares the feature parameters calculated in operation S702 with the thresholds calculated in operation S708 for the frame that is currently processed. Specifically, when the fundamental frequency (indicated by pitch) of the frame that is currently processed satisfies the aforementioned Formula (3), the frequency calculator 405 determines that the fundamental frequency of the frame that is currently processed is an outlier. Regarding the coefficient parameter α used for the distribution illustrated in FIG. 2A, a cumulative frequency of a frame that is obtained from the speaker who is in the suppressed state is higher than a cumulative frequency of a frame that is obtained from the speaker who is in the non-suppressed state. In other words, the number of frames that have pitch frequencies that are outliers is small. When the power (indicated by power) of the frame that is currently processed satisfies the aforementioned Formula (4), the frequency calculator 405 determines that the power of the frame that is currently processed is an outlier. Regarding the coefficient parameter β used for the distribution illustrated in FIG. 2B, a cumulative frequency of a frame that is obtained from the speaker who is in the suppressed state is lower than a cumulative frequency of a frame that is obtained from the speaker who is in the non-suppressed state. In other words, the number of frames that have power that is outliers is large.

Next, the frequency calculator 405 sums a counted number of outliers (that are pitch frequencies) of frames preceding the current frame and the result of the determination on whether or not the fundamental frequency of the current frame is an outlier, and whereby the frequency calculator 405 calculates the total number of outliers of frames that are among the current frame and the frames preceding the current frame. In addition, the frequency calculator 405 sums a counted number of outliers (that are power) of frames preceding the current frame and the result of the determination on whether or not the power of the current frame is an outlier, and whereby the frequency calculator 405 calculates the total number of outliers of frames that are among the current frame and the frames preceding the current frame. The number of the outliers (that are the pitch frequencies) of the frames that are among the current frame and the frames preceding the current frame is indicated by $N_{pitch}$, while the number of the outliers (that are the power) of the frames that are among the current frame and the frames preceding the current frame is indicated by $N_{power}$. As expressed by Equation (1), the frequency calculator 405 calculates the appearance frequency of the frames having the pitch frequencies that are the outliers. As expressed by Equation (2), the frequency calculator 405 calculates the appearance frequency of the frames having the power that is the outliers.

Next, the score calculator 501 illustrated in FIG. 5 performs operation S710 illustrated in FIG. 7. In operation S710, the score calculator 501 calculates a score on the basis of the appearance frequency $P_{pitch}$ of the frames having the pitch frequencies and the appearance frequency $P_{power}$ of the frames having the power.

Figure 14:
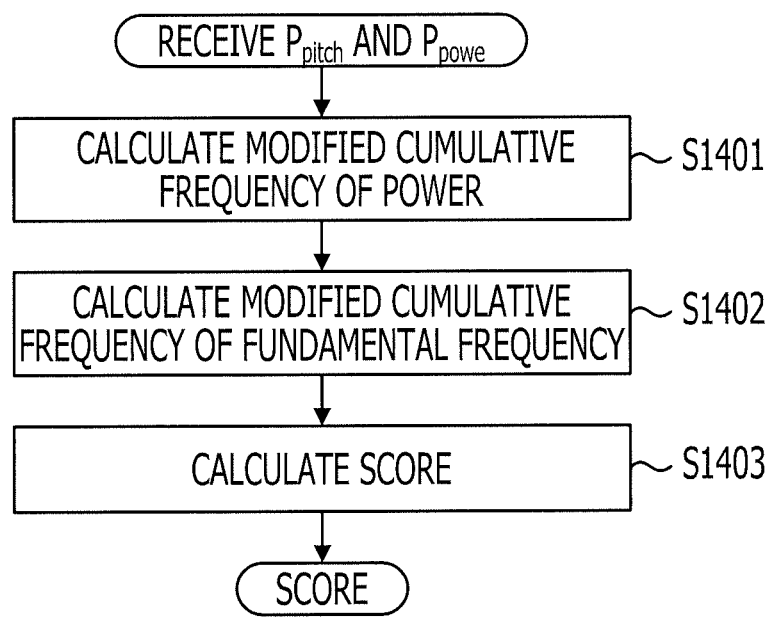
FIG. 14 is a flowchart of a control process that is performed by a score calculator.

FIG. 14 is a flowchart of a detailed control process that is performed in operation S710.

First, the score calculator 501 receives the appearance frequencies $P_{pitch}$ and $P_{power}$. In operation S1401, the score calculator 501 calculates a modified cumulative frequency of the frames having the power. As illustrated in FIGS. 10A, 10B, 11A and 11B, the higher the appearance frequency $P_{power}$ (calculated in operation S709) of the frames having the power that is the outliers, the more accurately the speaker may be determined to be in the suppressed state. A value that is obtained by subtracting the appearance frequency $P_{power}$ of the frames having the power that is the outliers from a certain constant (SCORE_NORM) is the modified cumulative frequency $Pdf_{power}$ of the frames having the power.

$$Pdf_{power} = SCORE\_NORM - P_{power} \quad (5)$$

As the speaker is in a more strongly suppressed state, the appearance frequency $P_{power}$ of the frames having the power that is the outliers is increased, and whereby the modified cumulative frequency $Pdf_{power}$ is reduced. As the constant SCORE_NORM, a value of 0.03 is used, for example. In this case, however, the modified cumulative frequency $Pdf_{power}$ is larger than 0.

Next, the score calculator 501 calculates a modified cumulative frequency of the frames having the pitch frequencies in operation S1402 illustrated in FIG. 14. As illustrated in FIGS. 8A, 8B, 9A and 9B, the lower the appearance frequency $P_{pitch}$ (calculated in operation S709) of the frames having the pitch frequencies that are the outliers, the more accurately the speaker may be determined to be in the suppressed state. A value that is obtained by multiplying the appearance frequency $P_{pitch}$ of the frames having the pitch frequencies that are the outliers by a certain constant (PITCH_NORM) is the modified cumulative frequency $Pdf_{pitch}$ of the frames having the pitch frequencies. The certain constant is a value that is used to adjust the modified cumulative frequency $Pdf_{pitch}$ so as to match the order of the modified cumulative frequency $Pdf_{power}$ (of the power) expressed by Equation (5) with the order of the modified cumulative frequency $Pdf_{pitch}$.

$$Pdf_{power}=\text{PITCH\_NORM} \cdot P_{pitch} \quad (6)$$

As the speaker is in a more strongly suppressed state, the appearance frequency $P_{pitch}$ of the frames having the pitch frequencies that are the outliers is reduced. A value of 1.0 is used as the constant PITCH_NORM when the order of the appearance frequency of the frames having the pitch frequencies that are the outliers is equal to or nearly equal to the order of the appearance frequency of the frames having the power that is the outliers.

Then, the score calculator 501 calculates a score from the modified cumulative frequency $Pdf_{power}$ (expressed by Equation (5)) of the frames having the power and the modified cumulative frequency $Pdf_{pitch}$ (expressed by Equation (6)) of the frames having the pitch frequencies in operation S1403 illustrated in FIG. 14. The score (SCORE) is the square root of the sum of the square of the modified cumulative frequency $Pdf_{pitch}$ and the square of the modified cumulative frequency $Pdf_{power}$ as expressed by the following Equation (7), for example.

$$\text{SCORE}=(Pdf_{pitch}^2+Pdf_{power}^2)^{1/2} \quad (7)$$

After the score calculator 501 calculates the score, the state determining unit 502 illustrated in FIG. 5 lastly performs operation S711 illustrated in FIG. 7. In operation S711, the state determining unit 501 determines whether or not the score (SCORE) calculated in operation S710 is equal to or smaller than a certain threshold. An experimentally set value is used as the certain threshold that is used in operation S711.

When the score is equal to or smaller than the certain threshold (YES in operation S711), the state determining unit 502 determines that the speaker is in the suppressed state in operation S712 illustrated in FIG. 7.

When the score is larger than the certain threshold (NO in operation S711), the state determining unit 502 determines that the speaker is in the non-suppressed state in operation S713 illustrated in FIG. 7.

Next, a method for calculating data of primary approximate straight lines that are used to determine the thresholds is described. The data of the primary approximate straight lines is calculated by a statistical process in advance and stored in the statistical data storage unit 404.

Figure 15:
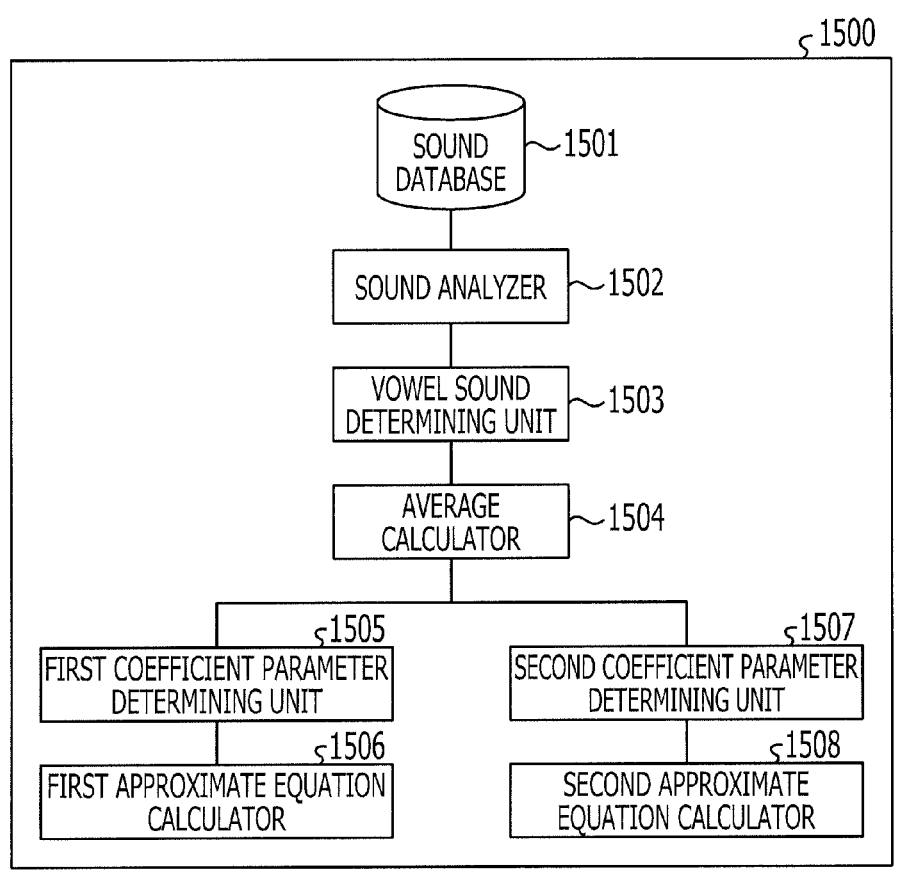
FIG. 15 is a block diagram illustrating a unit that performs a process of calculating data of primary approximate straight lines that are used to determine thresholds.

FIG. 15 is a block diagram illustrating a system 1500 that performs the process of calculating the data of the primary approximate straight lines.

A sound database 1501 stores data of voice sounds of a plurality of speakers. A sound analyzer 1502 performs the same operation as the sound analyzer 301 illustrated in FIG. 3. A vowel sound determining unit 1503 performs the same operation as the vowel sound determining unit 302 illustrated in FIG. 3. In the process of calculating the data of the primary approximate straight lines, the sound analyzer 1502 and the vowel sound determining unit 1503 first calculate a fundamental frequency and power of each of frames from the data that is stored in the sound database 1501 and represents the voice sounds of the plurality of speakers. An average calculator 1504 calculates the average of the pitch frequencies from data of each of the voice sounds of the plurality of speakers. In addition, the average calculator 1504 calculates the average of the power from the data of each of the voice sounds of the plurality of speakers.

Next, a first coefficient parameter determining unit 1505 calculates, for each of the speakers, a first coefficient parameter $\alpha$ that causes a cumulative frequency (as illustrated in FIGS. 8A, 8B, 9A and 9B) of a frame having a fundamental frequency to be a certain value. In this case, the certain value is, for example, 99%.

A first approximate equation calculator 1506 receives, for each of the speakers, a pair of the average (calculated by the average calculator 1504) of the pitch frequencies and the first coefficient parameter a calculated by the first coefficient parameter determining unit 1505 and performs linear regression analysis on the received pairs using a least squares method. As a result, the first approximate equation calculator 1506 calculates data of a primary approximate straight line from the pairs of averages of the pitch frequencies and coefficient parameters $\alpha$. In this case, the pairs of averages of the pitch frequencies and coefficient parameters $\alpha$ are plotted as illustrated in a graph of FIG. 12, for example, and the primary approximate straight line is approximated by the pairs of averages of the pitch frequencies and coefficient parameters $\alpha$. The primary approximate straight line is expressed by the following Equation (8).

$$\alpha=S_{pitch} \cdot \text{pitch\_mean}+I_{pitch} \quad (8)$$

An intercept $I_{pitch}$ and a slope $S_{pitch}$ of the primary approximate straight line approximated as expressed by Equation (8) are stored in the statistical data storage unit 404 illustrated in FIG. 4. In the process of detecting the suppressed state, the threshold determining unit 403 treats the average of the pitch frequencies as pitch_mean, uses the slope $S_{pitch}$ read from the statistical data storage unit 404 and the intercept $I_{pitch}$ read from the statistical data storage unit 404, calculates Equation (8) and determines the coefficient parameter $\alpha$.

In addition, a second coefficient parameter determining unit 1507 calculates, for each of the plurality of speakers, a second coefficient parameter $\beta$ that causes a cumulative frequency (as illustrated in FIGS. 10A, 10B, 11A and 11B) of a frame having power to be a certain value.

A second approximate equation calculator 1508 receives, for each of the speakers, a pair of the average (calculated by the average calculator 1504) of the power and the coefficient parameter $\beta$ calculated by the second coefficient parameter determining unit 1507 and performs linear regression analysis on the received pairs using a least squares method. As a result, the second approximate equation calculator 1508 calculates data of a primary approximate straight line from the pairs of averages of the power and coefficient parameters $\beta$. The primary approximate straight line is expressed by the following Equation (9).

$$\beta=S_{power} \cdot \text{power\_mean}+I_{power} \quad (9)$$

An intercept $I_{power}$ and a slope $S_{power}$ the primary approximate straight line approximated as expressed by Equation (9) are stored in the statistical data storage unit 404 illustrated in FIG. 4. In the process of detecting the suppressed state, the threshold determining unit 403 treats the average of the power as power_mean, uses the slope $S_{power}$ read from the statistical data storage unit 404 and the intercept $I_{power}$ read from the statistical data storage unit 404, calculates Equation (9) and determines the coefficient parameter $\beta$.

In the aforementioned embodiment, as expressed by Formulas (3) and (4), the coefficient parameter that corresponds to the ratio of an interested fundamental frequency to the average of the pitch frequencies is used. However, standard deviations may be used as statistical amounts.

For example, when a standard deviation of the pitch frequencies is indicated by pitch_std, the following formula is established.

$$\alpha \cdot (\text{pitch\_mean} + \gamma \cdot \text{pitch\_std}) < \text{pitch} \quad (10)$$

Where $\gamma$ is a parameter that is used to determine a multiple of the standard deviation so that a value that is different by the multiple of the standard deviation from the interested average is regarded as a standard.

Similarly, when a standard deviation of the power is indicated by power_std, the following formula is established.

$$\beta + \log_{10}(\text{power\_mean} + \lambda \cdot \text{power\_std}) < \log_{10}(\text{power}) \quad (11)$$

The parameters $\alpha$, $\beta$, $\gamma$ and $\lambda$ are adjusted and determined using various types of data.

A fundamental frequency that causes the coefficient parameter $\alpha$ to be 1.0 when the parameter $\gamma$ is 0.0 is equal to the average of the pitch frequencies. When the standard deviation is used, a fundamental frequency that causes the coefficient parameter $\alpha$ to be 1.0 may be a value that is different by a value of ($\gamma \cdot$pitch_std) from the average of the pitch frequencies. Thus, the threshold for outliers that are pitch frequencies may be set more freely.

Power that causes the coefficient parameter $\beta$ to be 0.0 when the parameter $\lambda$ is 0.0 is equal to the average of the power. When the standard deviation is used, power that causes the coefficient parameter $\beta$ to be 0.0 may be a value that is different by a value of ($\lambda \cdot$power_std) from the average of the power. Thus, the threshold for outliers that are power may be set more freely.

According to the aforementioned embodiment, the suppressed state of the speaker is detected on the basis of an outlier that is equal to or larger than the threshold that corresponds to the value obtained by multiplying the average of pitch frequencies of frames extracted from a voice sound by the interested coefficient parameter. In addition, according to the aforementioned embodiment, the suppressed state of the speaker is detected on the basis of an outlier that is equal to or larger than the threshold that corresponds to the value obtained by multiplying the average of power of frames extracted from a voice sound by the interested coefficient parameter. Since the thresholds are controlled using the linear regression that depends on the averages, the dependencies on the speakers may be adaptively eliminated.

Figure 16:
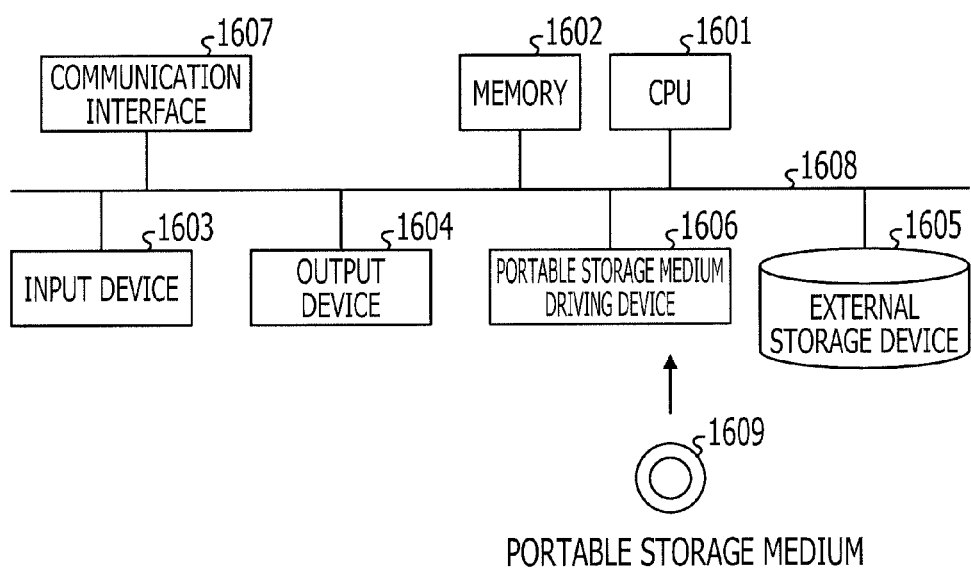
FIG. 16 is diagram illustrating the configuration of a hardware system that may achieve a system according to the embodiment.

FIG. 16 is a diagram illustrating an example of a hardware configuration of the computer that may achieve, as software processes, the control processes illustrated in FIGS. 7 and 14.

A computer that is illustrated in FIG. 16 includes a CPU 1601, a memory 1602, an input device 1603, an output device 1604, an external storage device 1605, a portable storage medium driving device 1606 and a communication interface 1607. A portable storage medium 1609 is inserted into the portable storage medium driving device 1606. The CPU 1601, the memory 1602, the input device 1603, the output device 1604, the external storage device 1605, the portable storage medium driving device 1606 and the communication interface 1607 are connected to each other through a bus 1608. The configuration that is illustrated in FIG. 16 is an example of the configuration of the computer that may achieve the aforementioned system. The configuration of the computer is not limited to the configuration illustrated in FIG. 16.

The CPU 1601 controls the entire computer. The memory 1602 is a RAM or the like and temporarily stores a program stored in the external storage device 1605 (or the portable storage medium 1609) or data stored in the external storage device 1605 (or the portable storage medium 1609) in order to execute the program or update the data. The CPU 1601 reads the program into the memory 1602, executes the program and thereby controls the entire computer. The external storage device 1605 is a storage medium. In addition, the portable storage medium 1609 is a storage medium. However, the computer-readable medium does not include a transitory medium such as a propagation signal.

The input device 1603 detects input operations performed by a keyboard, a mouse and the like and notifies the CPU 1601 of results of the detection. The output device 1604 outputs data transmitted under control of the CPU 1601 to a display device and a printing device.

The external storage device 1605 is a hard disk storage device, for example. A program and various types of data, which are used to perform the control processes illustrated in the flowcharts of FIGS. 7 and 14, are stored in the external storage device 1605.

The portable storage medium 1609 that is an optical disc, an SDRAM, Compact Flash (registered trademark) or the like is inserted into the portable storage medium driving device 1606. The portable storage medium driving device 1606 plays an auxiliary role for the external storage device 1605.

The communication interface 1607 is a device that connects the computer to a local area network (LAN), a wide area network (WAN) or a communication line of a public wireless communication network.

The system according to the present embodiment is achieved by causing the CPU 1601 to execute the program that includes the functions that are achieved in the processes illustrated in the flowcharts of FIGS. 7 and 14. The program may be stored in the external storage device 1605 and the portable storage medium 1609 and delivered. In addition, the program may be received by the communication interface (network connection device) 1607 from a network.

It is not necessary to perform speech recognition in the aforementioned embodiment, unlike the conventional techniques. Thus, the suppressed state of the speaker may be detected even under a highly noisy environment. In addition, since speech recognition is not performed, the system according to the embodiment may operate with a small number of resources. Furthermore, the system according to the embodiment is not affected by a speech recognition error and may detect any contents of voice sound.

In addition, since the thresholds are set using the average of pitch frequencies of each of input voice sounds and the average of power of each of the input voice sounds, differences among users having high voices, low voices, loud voices and quiet voices may be reduced and the states of the users may be determined using the fixed thresholds. Thus, voice sounds and genders of the users do not need to be registered. In addition, since an outlier that is power is high power, a signal-to-noise ratio is high. Thus, the suppressed state of the speaker may be detected even under a highly noisy environment.

In the embodiment, the pitch frequencies and the power are used as the results of the analysis of the voice sound. It is known that when the speaker feels pressure from outside, muscular excitation or relaxation occurs as a physiological reaction. The pitch frequencies and the power are easily affected by the physiological reaction in the vocal cord formed by muscles or the diaphragm formed by muscles. As described with reference to FIGS. 8A to 11B, when the speaker becomes the suppressed state, an intonation of a high voice sound is reduced, and whereby it is hard for the speaker to make a voice sound with a high fundamental frequency. Thus, an appearance frequency of frames that have outliers and are obtained from the speaker who is in the suppressed state is lower than an appearance frequency of frames that have outliers and are obtained from the speaker who is in the normal state. Specifically, when a fundamental frequency deviates from the average of pitch frequencies, a cumulative frequency of frames that are obtained from the speaker in the suppressed state and have the fundamental frequency that is an outlier becomes closer to 100% more quickly than the normal state. In addition, when the speaker becomes the suppressed state, it is hard for the speaker to make a voice sound with stable power and the power varies. As a result, an appearance frequency of frames having power that is outliers increases. Specifically, when power deviates from the average of the power, a cumulative frequency of frames that are obtained from the speaker in the suppressed state and have the power that is an outlier becomes closer to 100% more slowly than the normal state. By detecting the two changes, the suppressed state of the speaker may be detected.

Information of distributions of pitch frequencies and power that are obtained from many speakers (for learning) who are in the normal state and suppressed state is used, and whereby a primary approximate straight line is approximated by relationships between the averages of pitch frequencies and values that cause cumulative frequencies of frames having outliers to be a certain percentage, and a primary approximate straight line is approximated by relationships between logarithmic values of the averages of power and values that cause cumulative frequencies of frames having outliers to be a certain percentage. Then, the threshold for outliers that are pitch frequencies, and the threshold for outliers that are power, are determined on the basis of the data of the primary approximate straight lines, the average of the pitch frequencies to be used for the analysis, and the average of the power to be used for the analysis. By determining the thresholds, it is possible to reduce a variation (caused by differences among persons) in coefficient parameters and determine the suppressed state using the thresholds that do not vary depending on the differences among the persons.

The system according to the present embodiment analyzes the pitch frequencies and the power, which almost do not depend on the contents of the voice sound. Thus, the system according to the embodiment does not need to perform speech recognition. Thus, the system according to the embodiment may be easily installed in a device (such as a mobile phone) that has a small number of resources. In addition, the system according to the embodiment may receive a voice sound through a microphone that is provided for communication and included in the mobile phone. For example, the system according to the embodiment automatically records the contents (voice) of a conversation made using the mobile phone, automatically detects a strained state of a speaker from the recorded voice sound after the end of the conversation, and notifies a family of the speaker of the strained state using an email. These functions are useful to prevent a crime such as a phone call fraud.

For example, when a frustration of a driver may be detected through a voice sound of the driver by an operation of a car navigation system installed in a vehicle, the car navigation system or the like that operates on the basis of the state of the driver may be achieved. The system according to the embodiment may be installed in a computer that is used in an interactive robot. In addition, the system according to the embodiment may be installed in a computer that is used in a call center. The interactive robot detects a suppressed state of a user and has a conversation with the user on the basis of the state of the user. In addition, when the computer that is used in the call center detects a suppressed state of an operator, the computer starts recording a conversation with a customer and outputs a manual based on a situation.

In the aforementioned embodiment, the pitch frequencies and the power are used as the results of the analysis on the voice sound. In the embodiment, when the accuracy of extracting pitch frequencies from an input voice sound made under a highly noisy environment or the like is low, the suppressed state may be detected only using power obtained from the input voice sound.

The ratio of the number of frames having pitch frequencies to be used to detect a state of a user to the number of frames having power to be used to detect the state of the user may be changed by adjusting the constant (PITCH_NORM) of Equation (6).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A state detecting device comprising:
a memory; and
a processor coupled to the memory and configured to
receive voice sound information,
calculate values regarding a certain feature parameter extracted from each of a plurality of frames extracted from the voice sound information,
calculate a first average of the values,
determine a threshold based on the first average and statistical data stored in the memory, the statistical data representing relationships between second averages regarding the certain feature parameter and cumulative frequencies of the certain feature parameter, the second averages and the cumulative frequencies being generated based on a plurality of voice sound information acquired from speakers previously,
calculate an appearance frequency of a certain frame which has a value of the certain feature parameter that is larger than the threshold, among the plurality of frames,
determine, based on the appearance frequency, a strained state of a vocal cord regarding the voice sound information, and
output a result of a determination.

2. The state detecting device according to claim 1,
wherein the memory stores the second averages regarding the certain feature parameter obtained based on the voice sound information acquired from the plurality of speakers previously, are associated with ratios of feature parameters that are among other feature parameters and of which the cumulative frequencies are a certain value to the other averages, and
wherein the processor determines, on the basis of the statistical data, a ratio that is among the ratios and corresponds to the average, and the processor determines the threshold on the basis of the determined ratio and the average.

3. The state detecting device according to claim 1,
wherein the processor calculates a power of the plurality of frames as the certain feature parameter, and
wherein the processor determines that the higher an appearance frequency of a frame whose power is higher than the threshold, the higher the strained state.

4. The state detecting device according to claim 1,
wherein the processor calculates pitch frequencies of the plurality of frames as the certain feature parameter, and
wherein the processor determines that the lower an appearance frequency of a frame whose fundamental frequency is higher than the threshold, the higher the strained state.

5. The state detecting device according to claim 1,
wherein the processor calculates power and pitch frequencies of the plurality of frames as the certain feature parameter, and
wherein the processor determines that the higher an appearance frequency of a frame whose power is higher than the threshold and the lower an appearance frequency of a frame whose fundamental frequency is higher than the threshold, the higher the strained state.

6. The state detecting device according to claim 1,
wherein the processor determines whether or not the plurality of frames are vowel sound frames and calculates a feature parameter of a frame that is among the plurality of frames and is a vowel sound frame.

7. The state detecting device according to claim 2,
wherein the processor determines the threshold on the basis of the average and the statistical data that is data of a primary approximate straight line that represents correspondence relationships between the other averages of the other feature parameters obtained from the plurality of speakers and the ratios.

8. The state detecting device according to claim 1,
wherein the processor determines the threshold on the basis of the average and a standard deviation of the certain feature parameter.

9. The state detecting device according to claim 1, further comprising:
a microphone that receives a call voice sound; and
a transmitting device,
wherein the processor receives the call voice sound from the microphone,
wherein when the result of the determination indicates the strained state, the processor outputs, to the transmitting device, a command to instruct the transmitting device to transmit, to a certain destination, a notification that indicates the strained state, and
wherein the transmitting device transmits the notification to the certain destination.

10. A non-transitory storage medium storing a state detection program that causes a computer to execute:
receiving voice sound information;
calculating values regarding a certain feature parameter extracted from each of a plurality of frames extracted from the voice sound information;
calculating a first average of the values;
determining a threshold based on the first average and statistical data stored in the memory, the statistical data representing relationships between second averages regarding the certain feature parameter and cumulative frequencies of the certain feature parameter, the second averages and the cumulative frequencies being generated based on a plurality of voice sound information acquired from speakers previously;
calculating an appearance frequency of a certain frame which has a value of the certain feature parameter that is larger than the threshold, among the plurality of frames;
determining, based on the appearance frequency, a strained state of a vocal cord regarding the voice sound information; and
outputting a result of a determination.

11. A state detecting method comprising:
receiving voice sound information;
calculating values regarding a certain feature parameter extracted from each of a plurality of frames extracted from the voice sound information;
calculating a first average of the values,
determining a threshold based on the first average and statistical data representing relationships between second averages regarding the certain feature parameter and cumulative frequencies of the certain feature parameter, the second averages and the cumulative frequencies being generated based on a plurality of voice sound information acquired from speakers previously,
calculating an appearance frequency of a certain frame which has a value of the certain feature parameter that is larger than the threshold among the plurality of features;
determining, based on the appearance frequency, a strained state of a vocal cord regarding the voice sound information; and
outputting a result of a determination.

12. The state detecting method according to claim 11,
wherein the second averages regarding the certain feature parameter obtained based on the voice sound information acquired for the plurality of speakers previously, are associated with ratios of feature parameters that are among the other feature parameters and of which the cumulative frequencies are a certain value to the other averages, and
wherein the determining determines, on the basis of the statistical data, a ratio that is among the ratios and corresponds to the average, and determines the threshold on the basis of the determined ratio and the average.

13. The state detecting method according to claim 11, further comprising
calculating power of the plurality of frames as the feature parameters, and
determining that the higher an appearance frequency of a frame whose power is higher than the threshold, the higher the strained state.

14. The state detecting method according to claim 11, further comprising
calculating pitch frequencies of the plurality of frames as the feature parameters, and
determining that the lower an appearance frequency of a frame whose fundamental frequency is higher than the threshold, the higher the strained state.

15. The state detecting method according to claim 11, further comprising:
calculating power and pitch frequencies of the plurality of frames as the feature parameters, and
determining that the higher an appearance frequency of a frame whose power is higher than the threshold and the lower an appearance frequency of a frame whose fundamental frequency is higher than the threshold, the higher the strained state.

16. The state detecting method according to claim 11, further comprising determining whether or not the plurality of frames are vowel sound frames and calculates a feature parameter of a frame that is among the plurality of frames and is a vowel sound frame.

17. The state detecting method according to claim 12, further comprising determining the threshold on the basis of the average and the statistical data that is data of a primary approximate straight line that represents correspondence relationships between the other averages of the other feature parameters obtained from the plurality of speakers and the ratios.

18. The state detecting method according to claim 17, further comprising:

acquiring correspondence relationships between the other averages of the other feature parameters obtained from the plurality of speakers and the ratios; and calculating the data of the primary approximate straight line by performing straight line regression analysis on the correspondence relationships between the other averages of the other feature parameters obtained from the plurality of speakers and the ratios, and causes the data of the primary approximate straight line to be stored as the statistical data.

19. The state detecting method according to claim 11, further comprising determining the threshold on the basis of the average and a standard deviation of the feature parameters.

20. The state detecting method according to claim 11, wherein the receiving receives a call voice sound from a microphone included in a terminal device, and wherein the outputting outputs, to the terminal device, a command to instruct the terminal device to notify a certain destination of the strained state.

* * * * *